Sept. 16, 1947. A. D. PENTZ 2,427,620
ELASTIC DRIVE TRANSMISSION
Filed Sept. 19, 1944
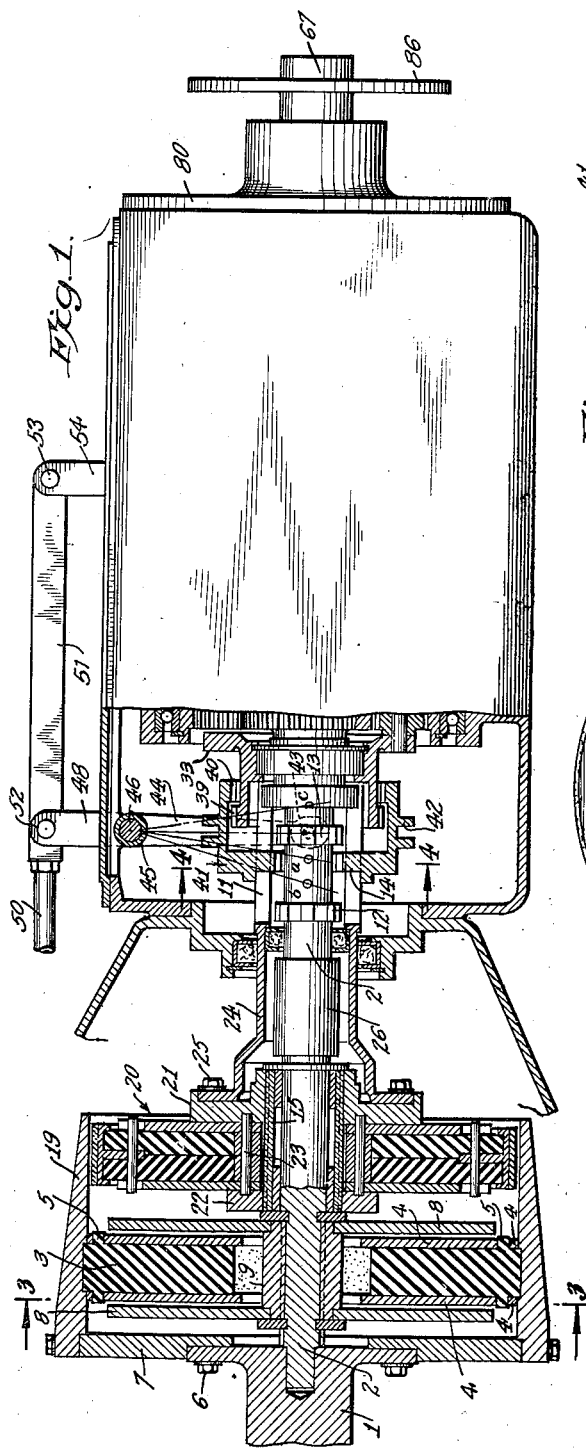
INVENTOR.
ALBERT D. PENTZ
BY Alexander Chessin
his ATTORNEY Patented Sept. 16, 1947

2,427,620

UNITED STATES PATENT OFFICE 2,427,620

ELASTIC DRIVE TRANSMISSION

Albert D. Pentz, New York, N. Y.

Application September 19, 1944, Serial No. 554,822

20 Claims. (Cl. 74—260)

This invention relates to power transmission, more particularly, as applied to automotive vehicles.

The invention belongs to the class of such devices wherein the transmission automatically passes from an indirect power path through a reduction gear (speed rate changing and torque amplifying) mechanism to a direct 1:1 power path between the driving and the driven shafts, and back again. This passage takes place at a predetermined speed. So long as the speed is maintained above this predetermined figure, the transmission remains stable, no change of power path being experienced because of possible fluctuations in the speed. But when the speed decreases back to this predetermined figure because of changed load characteristics or for any other reason, as, for instance, when an overload condition arises moving up on a steep hill behind slow moving traffic, causing the transmission to intermittently and continually change from one power path to the other, i. e., from the direct 1:1 transmission to the indirect path through the reduction gear mechanism and back again, the need arises for controlling and by-passing the automatic changes of the transmission. It is one of the principal objects of the present invention to meet this need by diverting the power of the direct transmission to the indirect path through the reduction gear mechanism when the speed of the vehicle falls back to the critical point at which the aforesaid intermittent change of power paths would otherwise occur. Another object of the invention is to provide a more efficient coupling between the driving and the driven elements in emergency cases, by utilizing the clutch which controls the change of power paths to reinforce the coupling between the engine shaft and the transmission shaft of the vehicle. Still another object is to simplify the transmission by making use of elastic clutches in lieu of fluid clutches both, for the coupling between the engine shaft and the transmission shaft, and for the above mentioned change of power paths. By elastic clutch is meant one incorporating an elastic material, such as rubber, natural or synthetic, and, in this particular invention, responsive to centrifugal forces, free of heavy moving masses and subject only to molecular action of the material itself.

An elastic clutch of this character is disclosed in my Patent No. 2,367,048, for a centrifugal clutch. In the present invention, there are two elastic clutches, one similar to the clutch described in said co-pending application and another one in which the function of lateral expansion of the elastic material is enhanced, constituting the main operative principle. This is accomplished to meet the purpose of the present invention to create a clutch wherein slippage is practically eliminated once the function of the coacting clutching elements has reached its ultimate object, i. e., a positive locking of these elements, but wherein some slippage precedes this ultimate object, so that no shock accompanies the passage of the device from the unlocked to the locked stage. It is further an object of the invention to produce a coupling with a minimum of power loss, as compared with fluid or mechanical couplings, whether due to slippage, or other causes, such as heat and friction. Another advantage of the new elastic clutch resides in its intrinsic cushioning effect, an effect to which attention is called to the aforesaid Patent No. 2,367,408, but which is greatly enhanced in the present form owing to its improved function of lateral expansion of the elastic material. Other objects of the invention will become apparent from the specification which follows and from the accompanying drawing in which Figure 1 is an axial cross section of a power transmission mechanism embodying the present invention. As a great number of features of this transmission are identical with those disclosed in my Patent No. 2,321,772, for Power transmission mechanism, the casing holding such identical elements is only partially open to view, and the same numerals are used in the present figure as in Figure 1 of the prior case, in order to save unnecessary details.

Figure 2 is a variant of the coupling shown in Figure 1, in cross section.

Figure 3 is a cross section taken along the line 3—3 of Figure 1.

Figure 4 is a cross section taken along the line 4—4 of Figure 1.

Referring to the figures in detail, 1 is the motor shaft of a vehicle, 2 an intermediary shaft piloted in and coaxial with the shaft 1. The intermediary shaft 2 is coupled to shaft 1 by means presently to be set forth and explained.

The intermediary shaft 2 constitutes a part of a planetary transmission mechanism in every way similar to the one disclosed in my aforesaid application Ser. No. 472,118, and, as here shown, is contained in its casing 30 partially broken off to show the connection between the formerly disclosed elements of the transmission and the novel features of the present transmission. One of the two power paths is from the driving (motor) shaft 1 to the driven (tail) shaft 67 through the aforesaid planetary mechanism. The other power path is through a releasable connection between the driving shaft 1 and the driven shaft 67. This releasable connection comprises a centrifugal clutch 20 of the type disclosed in my Patent No. 2,350,810 and in my Patent No. 2,367,408, so that a detailed description of this clutch may properly be omitted here, except to say that, as here shown, it includes the peripheral segments and friction lining.

The clutch 20 is rotatable on the shaft 2, being splined to the sleeve 15 through the rings 21 and 22 the pins 23. The ring 21 is secured to the hollow shaft 24, as by bolts 25. Releasable means are provided for connecting the shaft 24 and clutch 20 with the driven shaft 67. These releasable means comprise a spider 33 connected with the shaft 67 (as in the formerly disclosed device of the copending application Ser. No. 472,118) and provided with annular teeth 39 engageable with the teeth 40 of a connecting member 41 slidably splined in the hollow shaft 24. In the member 41 is a groove 42 to receive pins or rollers 43 extending from an arm 44 of a hollow tube 45. In the hollow tube 45 is a rod 46 secured to the tube 45. Another arm 48 is secured to the rod 46 and, together with a manually operated rod 50 and link 51, is pivoted at 52. The link 51 is pivotally connected at 53 to another arm 54, by the operation of which the transmission is changed from its neutral phase to either the forward or the reverse phase. It will be noted that the sliding movement of the member 41 and the transmission changes are jointly operated by the same rod 50. In the figure, the transmission is in its neutral phase. When the rod 50 is moved to the right, the transmission is in its forward driving phase. The member 41 will move either into the position corresponding to that indicated by the letter $a$, or into one corresponding to the letter $b$. In the first position, the teeth 39 and 40 will mesh, whereby the hollow shaft 24 will become locked to the driven shaft 67. When the member 41 is moved to the position corresponding to that indicated by the letter $b$, the teeth 39 and 40 will become disengaged, and the hollow shaft 24 will be disconnected from the driven shaft 67. To put the transmission in reverse, the rod 50 is moved in the opposite direction. When the member 41 is in the position corresponding to that indicated by the letter $c$, the teeth 39 and 40 are disengaged, and the hollow shaft 24 is disconnected from the driven shaft 67.

An internally toothed clutch member 14 forms a part of the connecting member 41. The teeth of the clutch member 14 pass through slots 11 in the hollow shaft 24. Secured to the intermediary shaft 2 are a pair of clutch members 12 and 13 having external teeth adapted to mesh with the internal teeth of the clutch member 14. Such meshing takes place when the member 41 is either in the position corresponding to that indicated by the letter $b$ or to that indicated by the letter $c$, i. e., when the driven shaft 67 is disconnected from the hollow shaft 24. At such times, therefore, the hollow shaft 24 and the clutch 20 will become locked to the intermediary shaft 2 and become a part of the planetary transmission.

The connection between the driving shaft 1 and the clutch 20 takes place when the expansion of the rubber disc of the clutch 20 causes it to become locked to the drum 19 secured to the side plate 7, which is rotatable as a unit with the shaft 1 to which the plate 7 is secured, as by bolts 6. Thus, when the vehicle attains a predetermined speed at which the clutch 20 is locked to the drum 19, and the hollow shaft 24 is connected to the driven shaft 67, the transmission of power is direct from the driving shaft 1 to the driven shaft 67 at the 1:1 rate.

The means for coupling the intermediary shaft with the driving shaft will now be described. A sleeve 9 is splined to the intermediary shaft 2. A pair of spaced plates 8, perpendicular to the shaft, are secured to the sleeve 9. Between the two plates 8, is a disc 3 of an elastic material, such as rubber, natural or synthetic; the disc 3 is in close contact with the drum 19 and may be imbedded therein, as shown. The disc 3 is lined on both sides with a friction lining or facing 4 of suitable material. Means are provided for keeping this facing in contact with the rubber disc. As here shown, these means comprise a series of knobs 5, projecting through holes in the facing 4 and shaped to stay put, as, for example, by having their diameters increase towards the outer end, the elasticity of the material allowing them to be forced through the holes. Owing to the smallness of the variation of the diameters, no variation is shown in the drawing, but it must be assumed. The inner surface of the facing is, preferably, slightly corrugated. The surface of the disc 3 may be provided with cooperating corrugations. These corrugations also, are too small to be shown on the drawing, but they have an important function in preventing slippage between the disc 3 and its facings 4, and in reducing the danger of a possible shearing action on the knobs 5.

The lateral expansion of the disc 3 in response to centrifugal forces generated by the rotation of the driving shaft 1 causes the disc 3 to become effectively locked to the plates 8, thus coupling the intermediary shaft 2 with the driving shaft 1 when the rotation of the latter assumes a sufficient speed. However, the lock is not effected immediately, a certain amount of slippage necessarily preceding the lock and cushioning the effects, thereby avoiding a possible shock.

Similar characteristics are features of the clutch 20.

It will be observed that with the present coupling all transmission drag is eliminated when the motor is idling and the vehicle is at rest. Also, that the undesirable feature of creeping present in transmissions with fluid couplings or standard friction clutches is avoided.

In Figure 2 is shown a somewhat simplified form of the coupling between the driving shaft and the intermediary shaft. Instead of the two plates 8, one is replaced by the side plate 7 of the drum 19, the disc 3 (103) being in contact with this plate 7, as well as with the drum 19. The other plate, designated by the numeral 108, retains its function. The disc 103 may again be provided with a friction facing 104, secured to the disc 103 by means of knobs 105. The locking of the clutch members in response to centrifugal forces generated by the rotation of the driving shaft 1 takes place in a similar manner, the only difference being that the lateral expansion of the disc 103 proceeds on one side alone.

The simplicity of the present transmission both as to construction and mode of operation, which is almost fool proof, its avoidance of clutch drag and vehicle creeping when the motor is idling, are advantages which any operator will readily appreciate. The ease of passage from the indirect power path with its torque multiplication to the direct 1:1 power path and back again, and the diversion of the direct path to the indirect path when the change is indicated as being necessary or desirable are features of great utility in special circumstances. Thus, when trying to pass a slow moving truck on a steep hill, in heavy two way traffic, it is desirable to prevent the transmission from automatically passing into its 1:1 direct phase, because under such conditions the transmission will persist in automatically passing from the indirect power path to the direct 1:1 path and back again at repeated intervals, with a concomitant decelerating effect on the motor. It is preferable to let the transmission remain in the torque amplifying phase until the emergency is passed and the change to the direct 1:1 power path is warranted. Prevention of the direct 1:1 transmission is accomplished by disconnecting the tail shaft from the second clutch and, at the same time, connecting this clutch with the intermediary shaft, whereby all the power is transmitted through the indirect path, i. e., through the reduction gear mechanism.

Another situation in which the present transmission form recommends itself is the emergency case wherein it is important to reinforce the coupling between the motor shaft and the intermediary shaft, as when the vehicle is compelled to proceed at a comparatively low speed, but not so low as to break the engagement between the drum 19 and the clutch 20. Since the coupling between the motor shaft and the intermediary shaft is responsive to the centrifugal forces generated by the rotation of the motor shaft, at the reduced speed of this shaft the coupling may not operate at its highest point of efficiency, i. e., there may be some slippage if the strain is excessive. Now, by disconnecting the tail shaft from the clutch 20 and connecting the clutch with the intermediary shaft, a second coupling is created between the motor shaft and the intermediary shaft, adding to the grip of the first clutch. Other circumstances may occur in which the novel features of the present transmission will appear to advantage, but utilization of the available advantages may well be left to the discretion of the operator in accordance with the circumstances in each case, and need not be further elucidated.

I claim:

1. A power transmission comprising a driving shaft, a driven shaft, a reduction gear mechanism, means for transmitting power from said driving shaft to said driven shaft through said reduction gear mechanism, including an intermediary shaft, a hollow shaft coaxial with and rotatable on said intermediary shaft, a clutch rotatable with said hollow shaft and subject to operative connection with said driving shaft, a releasable direct connection between said hollow shaft and said driven shaft, means for controlling said releasable connection, including a connecting member slidable on said hollow shaft, an internally toothed clutch member secured to said connecting member, said hollow shaft being provided with slots for the passage of the teeth of said internally toothed clutch member and a clutch member on said intermediary shaft adapted to become locked to said internally toothed clutch member when said slidable connecting member is in a position for which said hollow shaft is released from said driven shaft.

2. A power transmission comprising a driving shaft, a driven shaft, a reduction gear mechanism, means for transmitting power from said driving shaft to said driven shaft through said reduction gear mechanism, including an intermediary shaft, a hollow shaft coaxial with and rotatable on said intermediary shaft, a clutch rotatable with said hollow shaft and subject to operative connection with said driving shaft, a releasable direct connection between said hollow shaft and said driven shaft, means for controlling said releasable connection, including a connecting member slidable on said hollow shaft, an internally toothed clutch member secured to said connecting member, said hollow shaft being provided with slots for the passage of the teeth of said internally toothed clutch member, a couple of clutch members on said intermediary shaft, each adapted to become locked to said internally toothed clutch member, one during the forward phase of the transmission and one during the reverse phase, when said slidable connecting member is in a position for which said hollow shaft is released from said driven shaft.

3. A power transmission according to claim 2, wherein the clutch is elastically responsive to centrifugal forces generated by the driven shaft when the latter is connected to the hollow shaft, and to centrifugal forces generated by the intermediary shaft when the hollow shaft is released from the driven shaft.

4. A power transmission according to claim 2, wherein the means for transmitting power from the driving shaft to the driven shaft through the reduction gear mechanism includes an elastic clutch responsive to centrifugal forces generated by the rotation of the driving shaft.

5. A power transmission according to claim 2, wherein the clutch is an elastic clutch responsive to centrifugal forces generated by the driven shaft when the latter is connected with the hollow shaft, and to centrifugal forces generated by the intermediary shaft when the hollow shaft is released from the driven shaft, and the means for transmitting power from the driving shaft to the driven shaft through the reduction gear mechanism includes an elastic clutch responsive to centrifugal forces generated by the rotation of the driving shaft, the two clutches having a common operative element.

6. A power transmission comprising a driving shaft, a driven shaft, a reduction gear mechanism, means including a first clutch for transmitting power from said driving shaft to said driven shaft through said reduction gear mechanism, said reduction gear mechanism including an intermediary shaft, a second clutch engageable with said transmission means and subject to operative connection with said driving member, and means for selectively connecting said second clutch to said driven shaft directly or through said intermediary shaft.

7. A transmission according to claim 6, wherein the said second clutch is elastically responsive to centrifugal forces generated by the rotation of the driven shaft when said shaft is connected to the clutch, and to centrifugal forces generated by said intermediary shaft when the clutch is released from the driven shaft and connected to said intermediary shaft.

8. A power transmission according to claim 6, wherein the second clutch is elastically responsive to centrifugal forces generated by the driven shaft when said shaft is connected to said clutch, and to centrifugal forces generated by the intermediary shaft when the driven shaft is released from said clutch, and the means for transmitting power from the driving shaft to the driven shaft through the reduction gear mechanism also includes an elastic clutch responsive to centrifugal forces generated by the driving shaft, the two said clutches having a common element connected to said driving shaft.

9. In a power transmission, a reduction gear mechanism, means for transmitting power from a driving shaft to a driven shaft through said reduction gear mechanism, a clutch subject to operative connection with said driving shaft, a releasable direct connection between said clutch and said driven shaft, means for controlling said releasable connection, means for changing said transmission from its neutral phase to a forward or reverse driving phase, and means for jointly operating said controlling means and said transmission changing means.

10. A power transmission comprising a driving shaft, a driven shaft, a reduction gear mechanism, means for transmitting power from said driving shaft to said driven shaft through said reduction gear mechanism, additional transmission means subject to operative connection with said driving shaft, and means for selectively applying said additional means to said reduction gear mechanism or directly to said driven shaft.

11. A power transmission according to claim 10, wherein at least one of the transmission means includes a clutch responsive to centrifugal forces generated by the rotation of the shafts.

12. In a power transmission, a driving shaft, a driven shaft, a reduction gear mechanism, means for transmitting power from said driving shaft to said driven shaft through said reduction gear mechanism, including an intermediary shaft, a drum rotatable as a unit with said driving shaft, a pair of parallel plates on said intermediary shaft at right angles thereto and rotatable therewith, a disc of an elastic material intermediate said plates abutting circumferentially against said drum and laterally engageable by said plates in response to centrifugal forces generated by the rotation of said driving shaft, a clutch independent of said transmission means subject to operative connection with said driving shaft, and a releasable direct connection between said clutch and said driven shaft.

13. A power transmission according to claim 12, wherein the clutch operatively connected with the driving shaft consists of a pair of parallel plates at right angles to the driven shaft and rotatable therewith, and a disc of an elastic material intermediate said pair of plates for circumferential engagement with the drum in response to centrifugal forces generated by the rotation of the driven shaft.

14. A power transmission according to claim 12, wherein the disc of elastic material is provided with friction facings.

15. A power transmission according to claim 12, wherein the clutch operatively connected with the driving shaft consists of a pair of parallel plates at right angles to the driven shaft and rotatable therewith, a disc of an elastic material intermediate said pair of plates for circumferential engagement with the drum, and a friction lining on said disc along its circumference.

16. A power transmission according to claim 12, wherein one of the pair of plates is replaced by a side plate secured to the driving shaft, and a disc of an elastic material is in circumferential contact with the drum and in lateral contact with said side plate.

17. In a power transmission, a driving shaft, a driven shaft, a reduction gear mechanism, means for transmitting power from said driving shaft to said driven shaft through said reduction gear mechanism, including an intermediary shaft, a drum rotatable as a unit with said driving shaft, a pair of parallel plates on said intermediary shaft rotatable therewith, a disc of an elastic material intermediate said pair of plates abutting circumferentially against said drum and laterally engageable by said plates in response to centrifugal forces generated by the rotation of said driving shaft, friction facings on said disc, means for holding said facings in contact with said disc, means on the inner surface of said facings for preventing slippage between said disc and its facings, a clutch independent of said transmission means subject to operative connection with said driving shaft, and releasable means directly connecting said clutch with said driven shaft.

18. A power transmission comprising a driving shaft, a driven shaft, a reduction gear mechanisms, means including a first clutch for transmitting power from said driving shaft to said driven shaft through said reduction gear mechanism, a second clutch engageable with said transmission means subject to operative connection with said driving shaft, and means for selectively engaging said second clutch with said reduction gear mechanism for cooperation with said first clutch, or directly to said driven shaft.

19. A power transmission according to claim 10, wherein the first mentioned transmission means includes an elastic clutch.

20. A power transmission according to claim 10, wherein both transmission means include elastic clutches.

ALBERT D. PENTZ.

REFERENCES CITED

The following references are of record in the file of this patent:

UNITED STATES PATENTS

| Number | Name | Date |
|---|---|---|
| 2,167,873 | Burtnett | Aug. 1, 1939 |
| 2,185,538 | Burtnett | Jan. 2, 1940 |
| 2,259,729 | Burtnett | Aug. 21, 1941 |
| 2,340,415 | Eason | Feb. 1, 1944 |
| 2,367,048 | Pentz | Jan. 9, 1945 |
| 2,381,772 | Pentz | Aug. 8, 1945 |
| 826,793 | Mack | July 24, 1906 |
| 1,345,688 | Moore | July 6, 1920 |